Patented Jan. 7, 1941

2,228,160

UNITED STATES PATENT OFFICE 2,228,160

PROCESS FOR EXCHANGING CATIONS

Hans Wassenegger, Dessau in Anhalt, Robert Griessbach, Wolfen, Kreis Bitterfeld, and Walther Sütterlin, Bitterfeld, Germany, assignors to I. G. Farbenindustrie Aktiengesellschaft, Frankfort-on-the-Main, Germany No Drawing. Application May 18, 1939, Serial No. 274,402. In Germany July 14, 1936

2 Claims. (Cl. 210—24)

This application is a continuation in part of our application Ser. No. 152,784, filed July 9, 1937.

Our present invention relates to a process for exchanging cations in aqueous solutions. Further objects of our invention will be seen from the detailed specification following hereafter.

It is well known in the art that condensation products of aldehydes and polyhydroxybenzenes may be used as cation exchangers. Corresponding compounds made from monohydroxybenzene and its homologous compounds are not applicable for this purpose.

Now we have found that cation-exchangers of outstandingly good properties are producible from monohydroxybenzene, its homologous compounds or its alkali metal salts, if acid groups are introduced into the molecule by a suitable treatment with sulfites, bisulfites or $SO_2$. These products have nothing in common with the well known artificial tanning agents made from hydroxybenzene-aldehyde condensation products, since according to our present invention the condensation and acidification is carried out under such conditions that water-insoluble products are formed. By a suitable adjustment of the amounts of sulfite and aldehyde the desired insoluble reaction products are formed in any case, the most suitable amount to employ with the particular monohydroxybenzene being easily determinable by a few simple comparative experiments.

The formation of a resin even occurs if 0.7 mol. $SO_3''$ are added per mol. hydroxybenzene, the condensation products becoming insoluble in water as necessary for exchanging bodies by after-treatment with, for instance, hydrochloric acid. This after-treatment with an acid is suitable likewise in the production of resins having a somewhat lower acid character. The treatment with a sulfite can be carried out during or after the formation of the monohydroxybenzene-aldehyde resins, the manufacture of the endproducts being possible even when carrying out the condensation and treatment with a sulfite in several stages. We assume that in our process ω-sulfonic acids of the hydroxybenzene are formed, and, in fact, these ω-sulfonic acids may be used per se as starting materials.

The drying of the primary formed resinous jellies is carried out in such a way, that the gel structure is maintained.

The examples following hereafter serve to illustrate our invention, the parts being by weight, if not indicated otherwise.

*Example 1.*—216 parts of meta-hydroxytoluene and 252 parts of sodium sulfite are heated for 8 hours to 100° C. together with 500 parts of water and 200 parts of a formaldehyde solution of 30 per cent strength. Then a further amount of 650 parts of meta-hydroxytoluene dissolved with 60 parts of caustic soda in 250 parts of water is added to the reaction mixture together with 800 parts of a formaldehyde solution of 40 per cent strength. After boiling for about 1 hour, the solution solidifies to a solid gel which is dried at 80° C. After reduction to small pieces it is a valuable product for exchanging cations with a capacity by weight of 2.1 per cent (calculated on CaO).

*Example 2.*—1500 parts of a resin disintegrated to form grains of 0.5 to 2 mm. diameter and produced by condensation of a solution of 1880 parts of hydroxybenzene, 200 parts of caustic soda in 3000 parts of water together with 880 parts of a formaldehyde solution of 40 per cent strength are boiled for an hour under reflux together with a solution of 256 parts of sodium sulfite and 200 parts of a solution of formaldehyde of 30 per cent strength in 2000 parts of water. Then the resin is separated from the solution and washed with water. The material exhibits good properties of exchanging cations.

*Example 3.*—A solution of 1500 parts of hydroxybenzene and 504 parts of sodium sulfite in 1500 parts of water and 400 parts of a formaldehyde solution of 30 per cent, strength are boiled under reflux for 10 hours. After addition of a further amount of 600 parts of a formaldehyde solution of the same concentration the solution solidifies when heated for 20 hours to 95 to 100° C. The product thus obtained is dried at 75 to 80° C. and when reduced to small pieces is an excellent cation-exchanging material with a capacity by weight of 3.1 per cent. (calculated on CaO).

*Example 4.*—376 parts of hydroxybenzene are introduced into a solution of 504 parts of sodium sulfite in 1000 parts of water and 120 parts of a formaldehyde solution of 30 per cent. strength and then boiled under reflux for 12 hours. In the solution thus obtained there are dissolved at 90 to 100° C. a further amount of 1128 parts of hydroxybenzene dissolved in 540 parts of water and 120 parts of caustic soda and then at boiling temperature, while stirring, 600 parts of a formaldehyde solution of 30 per cent. strength are introduced within an hour. Boiling is continued for about 3 hours, the solution solidifying under formation of a gel which is reduced to small pieces after having been allowed to stand for 15 hours at 100° C. and is dried at 75 to 80° C.

When using the exchange-bodies produced according to this example, for removing the hardness of a tap water of 22° hardness (German degree), the material takes up 2.7 per cent. of CaO calculated on its own weight.

Example 5.—940 parts of hydroxybenzene and 340 parts of sodium sulfite are dissolved in 1400 parts of water and 1700 parts of a formaldehyde solution of 40 per cent. strength. The solution is heated for 40 hours to 90 to 100° C. Then the solution solidifies and the gel formed becomes hard. After drying at 75 to 80° and reduction to small pieces, the material is a very good cation-exchanger which when used for removing the hardness of water, shows a capacity of about 3 per cent. by weight (calculated on CaO).

Example 6.—940 parts of hydroxybenzene are boiled for 10 hours under reflux with a solution of 1260 parts of sodium sulfite in 2500 parts of water and 1000 parts of formaldehyde solution of 30 per cent. strength. To this solution there is added a further amount of 400 parts of hydroxybenzene and 2000 parts of a formaldehyde solution of 30 per cent. strength and the whole is heated for 24 hours to 100° C. During this time the solution solidifies and becomes hard. After drying at 80° C. and comminution the resin is boiled for 2 hours with hydrochloric acid of about 20 per cent. strength. It is separated from the liquid and washed until neutral. It may be used as a cation-exchanging body in a neutral or acid medium.

Example 7.—984 parts of hydroxybenzene, 1208 parts of sodium sulfite, 2400 parts of water and 1760 parts of a formaldehyde solution of 30 per cent. strength are heated for 15 hours to 100° C. 1000 parts of hydroxybenzene and 4600 parts of a formaldehyde solution of 30 per cent. strength are added at 60° C. The mixture gets warm and solidifies after some boiling to a jelly which after standing for 24 hours is dried at 100° C. and comminuted to pieces of 0.3 to 1.5 mm. diameter. One part by volume of this material is treated with one part by volume of sulfuric acid (monohydrate) for about 20 hours. When mixing the components the temperature raises to about 110° C. The resin washed with water until neutral is an excellent cation-exchanger which is resistant to hot water and weak alkaline solutions, the capacity by volume being 0.8 to 0.9 per cent. (calculated on CaO).

Example 8.—1000 parts of hydroxybenzene, 1260 parts of sodium sulfite, 2000 parts of water and 1200 parts of a formaldehyde solution of 30 per cent. strength are heated for 6 hours to 100° C. Further 880 parts of hydroxybenzene and 2600 parts of a formaldehyde solution of 30 per cent. are added. After boiling for 20 hours the solution solidifies to a jelly which is dried at 100° C. until the weight is constant. After comminution to pieces of 0.3-1.5 mm. diameter the material is boiled for 2 hours with hydrochloric acid 1 : 1. The capacity by volume of the resin is 1.7 per cent. (calculated on CaO).

It is obvious that our invention is not limited to the foregoing examples or to the specific details given therein. Various modifications and changes in details are considered to be within the spirit of this invention and the scope of the claims following hereafter. Thus, for instance, $\omega$-sulfonic acids of monohydroxybenzene may be prepared in a separate process and used as starting materials. This variation is not limited to the use of $\omega$-methylene sulfonic acids, but here likewise the homologous compounds derived from another alkyl radicle may be chosen for the resinification. The quantities of the reacting substances may be varied within certain limits, whereat care is to be taken that the endproduct is insoluble in water, an increased water-solubility being caused by a plurality of—$SO_3H$-groups introduced into the molecule. As pointed out, resin formation occurs even if 0.7 mol. $SO_3''$ are present in the reaction mixture per mol. hydroxybenzene, but generally, we prefer to use no more than about 0.5 mol. $SO_3''$. In order to diminish the swelling of the resins when contacted with water, an after-treatment with an acid while heating, for instance, with hydrochloric acid, sulfuric acid or phosphoric acid is suitable.

The mentioned exchanging resins may be used as neutral or hydrogen exchangers for purifying water, recovering metals, organic bases, etc.

What we claim is:

1. A process for exchanging cations in aqueous solutions which comprises subjecting the liquid to the action of a waterinsoluble monohydric phenol-formaldehyde resin containing $\omega$-sulfonic acid groups charged with the desired cations.

2. A process for exchanging cations in aqueous solutions which comprises subjecting the liquid to the action of a waterinsoluble monohydric phenol-formaldehyde resin containing $\omega$-sulfonic acid groups, said resin having been previously treated with a hot inorganic acid and charged with the desired cations.

HANS WASSENEGGER.
ROBERT GRIESSBACH.
WALTHER SÜTTERLIN.